United States Patent [19]

Palmer, Jr.

[11] Patent Number: 5,542,374
[45] Date of Patent: Aug. 6, 1996

[54] ANIMAL LITTER OF CLAY AND WESTERN RED CEDAR

[75] Inventor: Whitfield M. Palmer, Jr., Ocala, Fla.

[73] Assignee: MFM Industries, Inc., Ocala, Fla.

[21] Appl. No.: 332,900

[22] Filed: Nov. 1, 1994

[51] Int. Cl.⁶ ..................................................... A01K 1/015
[52] U.S. Cl. ......................................... 119/173; 119/171
[58] Field of Search ................................... 119/173, 171, 119/172

[56] References Cited

U.S. PATENT DOCUMENTS

| | | |
|---|---|---|
| 3,941,090 | 3/1976 | Fry . |
| 4,386,579 | 6/1983 | Harsh et al. . |
| 5,044,324 | 9/1991 | Morgan et al. ........................ 119/171 |
| 5,154,594 | 10/1992 | Gamlen .................................. 119/171 |
| 5,271,355 | 12/1993 | Bilings .................................. 119/171 |

FOREIGN PATENT DOCUMENTS

| | | | |
|---|---|---|---|
| 2298272 | 8/1976 | France ................................. 119/171 |
| 2748752 | 5/1979 | Germany .............................. 119/173 |
| 094043 | 5/1985 | Japan .................................... 119/173 |
| 074527 | 4/1986 | Japan .................................... 119/173 |
| 1437186 | 5/1976 | United Kingdom ................... 119/173 |

OTHER PUBLICATIONS

"How cat litter is made", Amy D. Shojai–CAT FANCY, Oct. 1994, pp. 12–19.

*Primary Examiner*—Todd E. Manahan
*Attorney, Agent, or Firm*—Allen, Dyer, Doppelt, Franjola & Milbrath, P.A.

[57] ABSTRACT

An absorbent material useful as an animal litter contains generally a wood product and clay particles. Specifically, the wood product in the preferred embodiment is wood particles from Western Red Cedar trees, which are nontoxic and nonaromatic. The clay particles are crystalline clay particles comprising calcium montmorillonite, sodium bentonite, attapulgite, and calcium bentonite. The material has the properties of being nontoxic, nonallergenic, nonaromatic, natural, and deodorant. The material further has the properties of enhancing clumping and coating solid material.

9 Claims, No Drawings

ANIMAL LITTER OF CLAY AND WESTERN RED CEDAR

BACKGROUND OF THE INVENTION

1. Field of the Invention

The present invention relates to absorbent materials, and, more particularly, to compositions useful as animal litters.

2. Description of Related Art

The idea of using ground clay as an absorbent material in cat litter boxes dates from 1947, when "Kitty Litter" was invented to replace sand or ashes. At present, clay-based products are purported to account for more than 95% of the cat litter industry (Cat Fancy, October, 1994, p. 12).

Clay compositions vary depending upon the site from which it is mined. Generally, clay comprises inorganic materials composed primarily of anhydrous aluminum silicates in which a certain amount of magnesium, iron, alkali metals such as sodium or potassium, or alkaline earths such as calcium may be present. These clays occur predominantly as particles of size 2 micrometers or less and exhibit a net negative charge and plasticity when mixed with water. The clay minerals comprise the groups kaolin; talc pyrophyllite; smectite, including calcium montmorillonite and the expansive clay bentonite; vermiculite; true mica; brittle mica; chlorite; and variable clays as identified by the Nomenclature Committee of the Clay Minerals Society (R. T. Martin, 1991, Report of the clay minerals society nomenclature committee; Revised classification of clay minerals, *Clay and Clay Minerals,* Vol. 39, No. 3, pp. 333–35, as references in *Fundamentals of Soil Behavior,* Second Edition, J. K. Mitchell, p. 26, John Wiley & Sons, Inc., 1993). Also included are chain-structured clays such as sepiolite and attapulgite. The clumping properties of the clay may be adjusted by controlling the absorbency and mesh size.

The control of odor is also-an important criterion for animal litters. Absorbency is also important here, but it is also known to add a masking agent or antibacterial to control odor.

In addition to clay-based litters, it is also known in the art to utilize wood products, such as in the form of cedar chips (Cedar Lite, Cedrus International) or pellets made from the resin of heated ground aspen sawdust and bark (Gentle Touch Cat Litter, Gentle Touch Corp.). A mixture of cedar material and an alfalfa binder has been disclosed by Fry (U.S. Pat. No. 3,941,090), and an animal litter containing cedar in particulate form for cooperation with an absorbent soil, such as diatomaceous earth and clays is taught by Harsh et al. (U.S. Pat. No. 4,386,579). Pellets made from a mixture of poplar wood and peat are described by Bilings (U.S. Pat. No. 5,271,355).

Paper-based products are also known in the art. Pellets made from recycled paper are marketed as Bio-Flush Cat Litter (Ampro Industries), and short paper fibers from recycled paper are processed into Care Fresh Cat Litter (Absorption Corp.).

Vegetative products are also usable as absorbent materials. For instance, grain-based cat litters are known in the form of pellets (Cat Works, Absorption Corp.) and ground wheat products (Litter Mate, Productive Alternatives). Corncob litter is marketed as FieldFresh (The Andersons, Maumee, Ohio) and Cobby Cat (Sun Seed Co.). Pressed and dried citrus peels are made into CitraFresh (Blossom Products Co.), and pellets of ground straw grasses become Cat Country (Mountain Meadows).

SUMMARY OF THE INVENTION

It is an object of the present invention to provide an absorbent composition.

It is another object to provide such a composition for use as an animal litter.

It is an additional object to provide such a composition for use as an oil spill absorber.

It is yet another object to provide such a composition for use as a desiccant in damp areas.

It is a further object to provide such a composition that has nontoxic, nonallergenic, natural, deodorant, and nonaromatic properties.

These and other objects are achieved by the absorbent composition of the present invention, which comprises a mixture of a wood product and clay particles. The wood product preferably comprises wood particles. In a preferred embodiment, the wood particles comprise Western Red Cedar particles.

The features that characterize the invention, both as to composition and method of use, together with further objects and advantages thereof, will be better understood from the following description. These and other objects attained, and advantages offered, by the present invention will become more fully apparent as the description that now follows is read.

DETAILED DESCRIPTION OF THE PREFERRED EMBODIMENTS

A description of the preferred embodiments of the present invention will now be presented.

The preferred embodiment of the absorbent composition of the present invention comprises wood particles and clay particles having a maximum size of 6 mesh and occur in a volume ratio of 1 to 75 percent. The wood particles preferably comprise Western Red Cedar particles, and the clay particles preferably comprise Fuller's earth clay particles containing calcium montmorillonite, calcium bentonite, attapulgite, and sodium bentonite.

The preferred embodiment of the animal litter of the present invention comprises the cedar and clay particles as above, in a volume ratio generally in the range of 3 to 20 percent. Specifically, the clay particles comprise particles of crystalline clay and have a moisture content in the range of 6 to 14 percent.

There are two subembodiments of the above animal litter composition discussed in the preceding paragraph, a coarser and a finer composition. The detailed specifications of these embodiments are given in Tables 1 and 2, respectively. The mesh percentages are those obtained by sifting the product through a stacked series of screens of decreasing mesh size.

In the finer composition, the maximum size of the cedar particles is generally 16 mesh, the maximum size of the clay particles is generally 16 mesh, and the volume ratio of cedar particles to clay particles is generally 10 percent.

In the coarser composition, the minimum size of the cedar particles is 16 mesh, the maximum size of the cedar particles is 8 mesh, the maximum size of the clay particles is 6 mesh, and the volume ratio of cedar particles to clay particles is generally 10 percent.

Some of the advantageous features of the absorbent animal litter material of the present invention are that it is nontoxic, nonallergenic, nonaromatic, natural, and deodorant. In order to address the advantages, the animal litter material comprises particles of Western Red Cedar for absorbing moisture, for enhancing clumping properties, and for deodorizing material deposited thereinto and particles of Fuller's earth white crystalline clay for absorbing moisture and for coating solid material deposited thereinto.

As previously, two preferred subembodiments comprise a finer and a coarser mixture. In the finer composition, the cedar particles have a maximum size of generally 16 mesh, the clay particles have a maximum size of generally 16 mesh, and the volume ratio of cedar particles to clay particles is generally 10 percent.

In the coarser composition, the cedar particles have a maximum size of generally 6 mesh, the clay particles have a maximum size of generally 6 mesh, and the volume ratio of cedar particles to clay particles is generally 10 percent.

TABLE 1

| COARSER COMPOSITION | |
|---|---|
| Mesh #4 | <3% |
| Mesh #6 | 15–30% |
| Mesh #8 | 20–35% |
| Mesh #20 | 35–60% |
| Mesh #60 | 0–15% |
| Mesh #100 | <1.5 |
| Pan: | <1.0 |
| Bulk Density | 37 to 46 lb. per cu. ft. |
| Absorption | +60% (Water Ammonia Test) |
| Moisture | 6–13.5% |
| Color | Clay Granules with Wood Particles* |

*May also include light blue scented particles.

TABLE 2

| FINER COMPOSITION | |
|---|---|
| Mesh #16 | <5% |
| Mesh #20 | 10–25% |
| Mesh #50 | 75–90% |
| Mesh #60 | 1–15% |
| Mesh #80 to Pan | <25% |
| Bulk Density | 37 to 46 lb. per cu. ft. |
| Absorption | +60% (Water Ammonia Test) |
| Moisture | 6–13.5% |
| Color | Clay Granules with Wood Particles* |

*May include blue to light blue scented crystals.

It may be appreciated by one skilled in the art that additional embodiments and uses may be contemplated, including for moisture and odor control in damp areas and storage chests, for absorbing drippings in a grill, for suppressing fire, in planting soil, as a dried flower preservative, as a decorative granular substance for crafts.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the composition illustrated and described herein are by way of example, and the scope of the invention is not limited to the exact details of formulation.

Having now described the invention, the operation and use of preferred embodiment thereof, and the advantageous new and useful results obtained thereby, the new and useful compositions, and reasonable chemical equivalents thereof obvious to those skilled in the art, are set forth in the appended claims.

What is claimed is:

1. An absorbent composition comprising a mixture of:
   Western Red Cedar particles; and clay particles; wherein:
   the Western Red Cedar particles and the clay particles have a maximum size of 6 mesh; and
   the volume ratio of Western Red Cedar particles to clay particles is generally in the range of 1 to 75 percent.

2. The absorbent composition recited in claim 1, wherein the clay particles comprise Fuller's earth clay particles containing calcium montmorillonite, calcium bentonite, attapulgite, and sodium bentonite.

3. An animal litter composition comprising a mixture of:
   particles of Western Red Cedar; and
   Fuller's earth clay particles containing calcium montmorillonite, calciumbentonite, attapulgite, and sodium bentonite, wherein the volume ratio of cedar particles to clay particles is generally in the range of 3 to 20 percent.

4. The animal litter composition recited in claim 3, wherein the clay particles comprise particles of crystalline clay and have a moisture content in the range of 6 to 14 percent.

5. The animal litter composition recited in claim 4, wherein the maximum size of the cedar particles is generally 16 mesh, the maximum size of the clay particles is generally 16 mesh, and the volume ratio of cedar particles to clay particles is generally 10 percent.

6. The animal litter composition recited in claim 4, wherein the minimum size of the cedar particles is 16 mesh, the maximum size of the cedar particles is 8 mesh, the maximum size of the clay particles is 6 mesh, and the volume ratio of cedar particles to clay particles is generally 10 percent.

7. A nontoxic, nonallergenic, nonaromatic, natural, deodorant, absorbent animal litter material comprising:
   particles of Western Red Cedar for absorbing moisture, for enhancing clumping properties, and for deodorizing material deposited thereinto; and
   particles of Fuller's earth crystalline clay for absorbing moisture and for coating solid material deposited thereinto.

8. The animal litter material recited in claim 7, wherein the cedar particles have a maximum size of generally 16 mesh, the clay particles have a maximum size of generally 16 mesh, and the volume ratio of cedar particles to clay particles is generally 10 percent.

9. The animal litter material recited in claim 7, wherein the cedar particles have a maximum size of generally 6 mesh, the clay particles have a maximum size of generally 6 mesh, and the volume ratio of cedar particles to clay particles is generally 10 percent.

* * * * *